(12) United States Patent
Teahon et al.

(10) Patent No.: US 10,942,043 B2
(45) Date of Patent: Mar. 9, 2021

(54) ENCODER

(71) Applicant: PACCAR Inc, Bellevue, WA (US)

(72) Inventors: Jesse Teahon, Bellevue, WA (US); Daryl Toole, Bellevue, WA (US); DJ Sutterfield, Bellevue, WA (US); Brian Holdeman, Bellevue, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 16/522,486

(22) Filed: Jul. 25, 2019

(65) Prior Publication Data

US 2021/0025734 A1    Jan. 28, 2021

(51) Int. Cl.
  *G01D 5/245* (2006.01)
  *G01B 7/00* (2006.01)
  *F16H 61/02* (2006.01)

(52) U.S. Cl.
  CPC ........... *G01D 5/2451* (2013.01); *G01B 7/003* (2013.01); *F16H 2061/0279* (2013.01)

(58) Field of Classification Search
  None
  See application file for complete search history.

(56) References Cited

U.S. PATENT DOCUMENTS

| 8,215,188 B2 * | 7/2012 | Klimenko | B62D 6/10 73/862.31 |
| 9,090,435 B2 * | 7/2015 | Kawakami | B66B 11/043 |

\* cited by examiner

*Primary Examiner* — Roy Y Yi
(74) *Attorney, Agent, or Firm* — Seed Intellectual Property Law Group LLP

(57) ABSTRACT

A rotary encoder may include a housing having an input-side portion and an output-side portion, and an internal cavity formed therein. The housing and its internal cavity can house a central shaft configured to transfer torque from an output shaft of a motor to an input shaft of a mechanical device such as a winch or a hoist. The housing and its internal cavity can house other components including printed circuit boards, an encoder disc, a ball bearing, and a seal.

20 Claims, 15 Drawing Sheets

ENCODER

BACKGROUND

Technical Field

The present disclosure relates generally to encoders that measure mechanical position and/or movement, and more particularly to absolute or incremental rotary encoders that are integrated with hoists or winches.

Description of the Related Art

Rotary encoders can be used to measure positions and/or movements of rotatable objects, and typically output electrical signals indicative of the positions and/or movements measured. When a rotary encoder is to be used with heavy equipment, such as construction, forestry, and/or agricultural equipment, and with hoists or winches thereof in particular, a standard, "off-the-shelf" rotary encoder is typically selected, purchased, and coupled to the piece of equipment, such as to the hoist or winch. Such currently-available rotary encoders are typically directly coupled to a rotatable drum of the hoist or winch.

BRIEF SUMMARY

A system may be summarized as comprising: a motor including an output shaft; a rotary encoder including a central shaft having an input end and an output end, the input end of the central shaft mechanically coupled and rotationally locked to the output shaft of the motor; and a mechanical device selected from the group consisting of: a winch and a hoist; wherein the mechanical device includes an input shaft, the output end of the central shaft of the rotary encoder mechanically coupled and rotationally locked to the input shaft of the mechanical device.

The mechanical device may include a gearbox and the input shaft may be mechanically coupled directly to the gearbox. The mechanical device may include a spool and the gearbox may be mechanically coupled directly to the spool. The motor may include a flange and the rotary encoder may be mounted directly to the flange. The rotary encoder may include a housing and a gasket and the gasket may seal the housing to the flange of the motor. The output end of the central shaft of the rotary encoder may have an outer surface that includes a first plurality of spline teeth and the input shaft of the mechanical device may have a second plurality of spline teeth engaged with the first plurality of spline teeth. The input end of the central shaft of the rotary encoder may have an inner surface that includes a first plurality of spline teeth and the output shaft of the motor may have a second plurality of spline teeth engaged with the first plurality of spline teeth.

The input end of the central shaft of the rotary encoder may have an outer surface that includes a first portion adjacent to the output end of the central shaft that has a first outer diameter, a second portion adjacent to the first portion that has a second outer diameter greater than the first outer diameter, a third portion adjacent to the second portion that has a third outer diameter greater than the second outer diameter, and a fourth portion adjacent to the third portion that has a fourth outer diameter less than the third outer diameter and less than the second outer diameter.

The system may further comprise a ball bearing mounted on the first portion of the outer surface of the input end of the central shaft. The system may further comprise a seal mounted on the second portion of the outer surface of the input end of the central shaft. The system may further comprise an encoder disc mounted on the fourth portion of the outer surface of the input end of the central shaft. The system may further comprise a groove that extends radially inward into the first portion of the outer surface of the input end of the central shaft; and a retaining ring mounted in the groove.

A method may be summarized as comprising: rotationally locking an input end of a central shaft of a rotary encoder to an output shaft of a motor so that the input end of the central shaft is rotationally locked to the output shaft of the motor; rotationally locking an output end of the central shaft of the rotary encoder to an input shaft of a mechanical device selected from the group consisting of: a winch and a hoist; and operating the motor to turn the output shaft, the central shaft of the rotary encoder, and the input shaft of the mechanical device.

Torque may be transferred directly from the output shaft of the motor to the central shaft of the encoder and directly from the central shaft of the encoder to the input shaft of the mechanical device. Torque may be transferred from the input shaft of the mechanical device to a gearbox of the mechanical device and from the gearbox of the mechanical device to a spool of the mechanical device. The method may further comprise using the rotary encoder to measure a position of the spool of the mechanical device. The system may further comprise using the rotary encoder to measure a speed of the spool of the mechanical device. The system may further comprise mounting the rotary encoder directly to a flange of the motor.

A system may be summarized as comprising: a rotary encoder including a central shaft having an input end and an output end; and a mechanical device selected from the group consisting of: a winch and a hoist, wherein the mechanical device includes an input shaft and the output end of the central shaft of the rotary encoder is mechanically coupled and rotationally locked to the input shaft of the mechanical device. The system may further comprise a hydraulic motor including an output shaft, wherein the input end of the central shaft mechanically coupled and rotationally locked to the output shaft of the motor.

DETAILED DESCRIPTION

Figure 1:
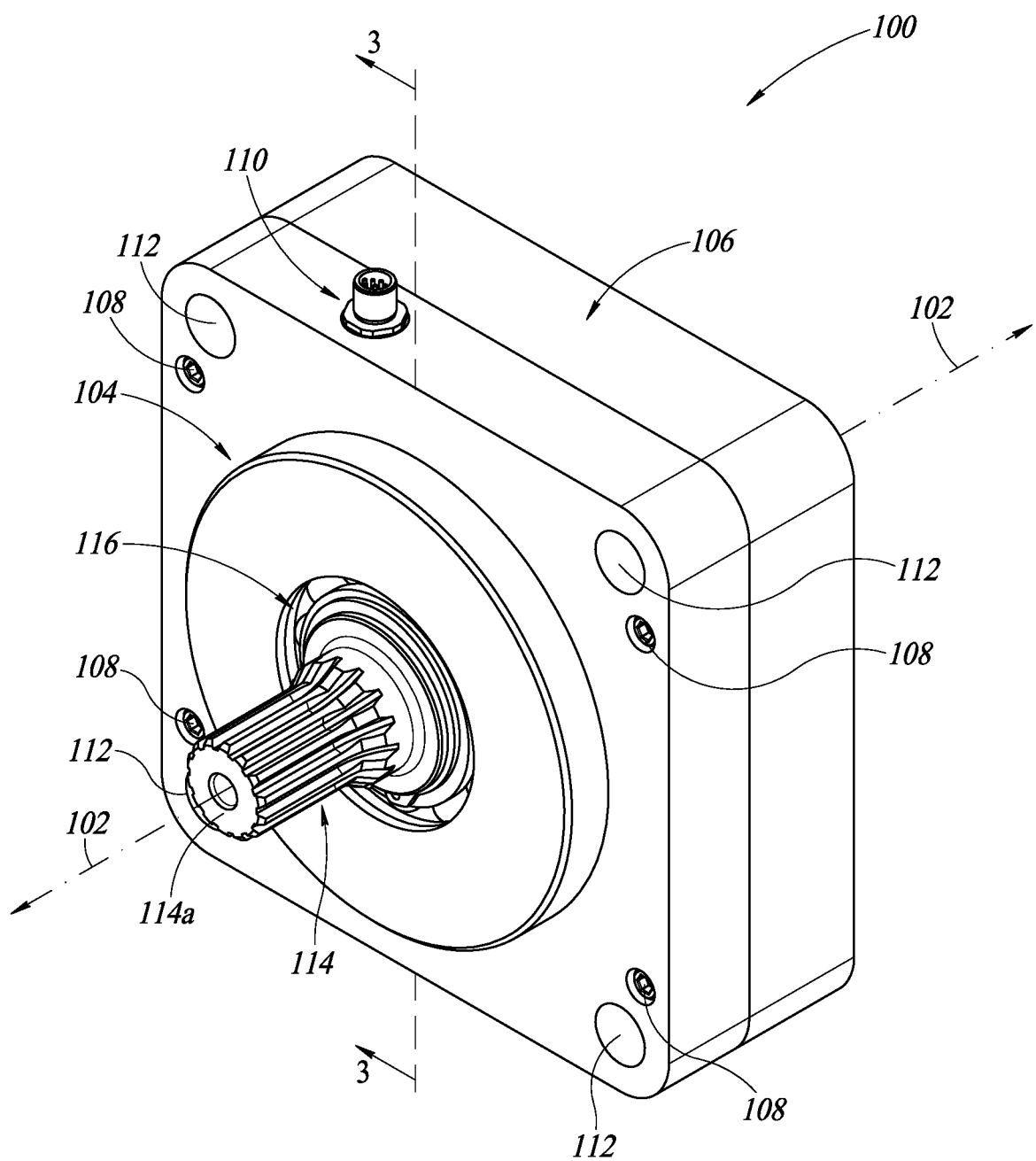
FIG. 1 is a perspective view of a rotary encoder.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Figure 2:
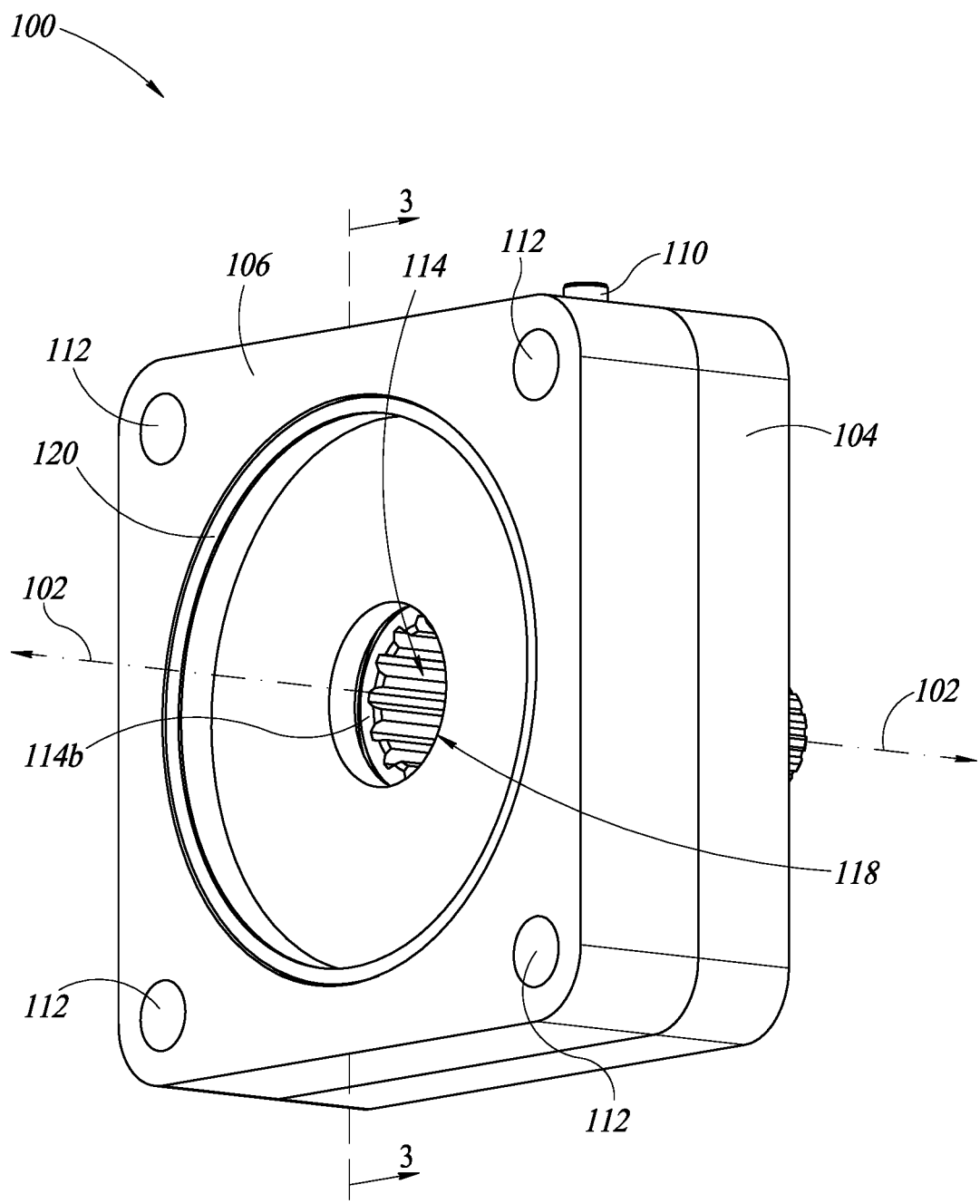
FIG. 2 is another perspective view of the rotary encoder of FIG. 1.

FIG. 1 illustrates a first perspective view, and FIG. 2 illustrates a second perspective view, of a rotary encoder 100. As illustrated in FIGS. 1 and 2, the rotary encoder 100 includes a housing having a first portion 104, which may be referred to as an "output-side" portion 104 of the housing, and a second portion 106, which may be referred to as an "input-side" portion 106 of the housing. The housing, including its output-side portion 104 and its input-side portion 106, houses a plurality of other components of the rotary encoder 100, as described further elsewhere herein. Some of such components of the rotary encoder 100 have cylindrical, generally cylindrical, rotationally symmetric, or generally rotationally symmetric shapes when viewed along a common, or shared, central longitudinal axis 102. That is, each of a variety of components of the encoder 100 has a respective central longitudinal axis, with each of those respective central longitudinal axes being coincident with one another, as illustrated by axis 102 in FIGS. 1 and 2.

As illustrated in FIGS. 1 and 2, the output-side portion 104 and the input-side portion 106 of the housing of the encoder 100 abut one another along a plane that is perpendicular to the central longitudinal axis 102. The output-side portion 104 and the input-side portion 106 each have a respective overall shape generally comprising a rectangular prism with rounded corners. The output-side portion 104 of the housing has a first major surface that is perpendicular to the central longitudinal axis 102 and faces away from the input-side portion 106 of the housing, and a second major surface that is parallel to its first major surface and faces toward the input-side portion 106 of the housing. The input-side portion 106 of the housing has a first major surface that is perpendicular to the central longitudinal axis 102 and faces away from the output-side portion 104 of the housing, and a second major surface that is parallel to its first major surface and faces toward the output-side portion 104 of the housing. The second major surface of the output-side portion 104 abuts the second major surface of the input-side portion 106.

The output-side portion 104 has four outer, peripheral side surfaces, each arranged perpendicular to its first and second major surfaces and extending from its first major surface to its second major surface. Corners where the four peripheral side surfaces of the output-side portion 104 meet each other are rounded or curved, with axes extending along the centers of the curves parallel to the central longitudinal axis 102. The input-side portion 106 also has four outer, peripheral side surfaces, each arranged perpendicular to its first and second major surfaces and extending from its first major surface to its second major surface. Corners where the four peripheral side surfaces of the input-side portion 106 meet each other are rounded or curved, with axes extending along the centers of the curves parallel to the central longitudinal axis 102. Each of the four peripheral side surfaces of the output-side portion 104 are aligned with a respective one of the side surfaces of the input-side portion 106, such that the housing as a whole has an overall shape generally comprising a rectangular prism with rounded corners.

As illustrated in FIG. 1, the rotary encoder 100 includes four mechanical fasteners 108 that extend along axes parallel to the central longitudinal axis 102 through the output-side portion 104 of the housing and into the input-side portion 106 of the housing of the encoder 100. The mechanical fasteners may be screws, bolts, or other fasteners, and are used to couple or fasten the output-side portion 104 of the housing to the input-side portion 106 of the housing to enclose internal components of the encoder therein. As illustrated in FIGS. 1 and 2, the rotary encoder 100 includes an electrical connector 110 that extends out one of the side surfaces of the output-side portion 104 of the housing. The electrical connector 110 can connect electrical components inside the rotary encoder 100 to electrical components outside the rotary encoder 100, such as to allow power to flow into the rotary encoder 100 to power operation of the components therein, and/or to allow signals indicative of measurements taken by the rotary encoder 100 to flow out of the rotary encoder 100.

As also illustrated in FIGS. 1 and 2, the housing of the rotary encoder 100, including both the output-side portion 104 and the input-side portion 106 thereof, has four apertures or through-holes 112 that extend all the way through the housing from the first major surface of the output-side portion 104 to the first major surface of the input-side portion 106. The through-holes 112 extend along respective axes that are parallel to the central longitudinal axis 102 and allow an operator to couple the encoder to other components, such as winches, hoists, pumps, or motors, such as hydraulic, pneumatic, or electric motors, such as with bolts, screws, or other fasteners that extend through the through-holes 112. As also illustrated in FIGS. 1 and 2, the rotary encoder 100 includes a central shaft 114 that extends through the encoder 100 and that has a central longitudinal axis that is coincident with the central longitudinal axis 102. The central shaft 114 has a first end portion 114a, which may be referred to as an "output-side" end portion 114a, and a second end portion 114b, which may be referred to as an "input-side" end portion 114b. The output-side end portion 114a of the central shaft 114 extends through an aperture 116 in the first major surface of the output-side portion 104 of the housing, such that other components can be coupled thereto. The input-side end portion 114b of the central shaft 114 is accessible through a circular or cylindrical aperture 118 in the first major surface of the input-side portion 106 of the housing, such that other components can be coupled thereto. Thus, a first component, such as an output shaft of a hydraulic motor (which in some cases can be operated in reverse to function as a hydraulic pump), can be coupled to the input-side end portion 114b of the central shaft 114 and a second component, such as an input shaft of a winch, a hoist, or a pump, can be coupled to the output-side end portion 114b of the central shaft 114. In such implementations, the central shaft 114 of the encoder can transfer rotational movement and/or torque from the first component to the second component. As illustrated in FIG. 2, the rotary encoder 100 includes an external seal or gasket 120 that can seal the first major surface of the input-side portion 106 of the housing against a complementary surface of a system such as a hydraulic motor.

Figure 3:
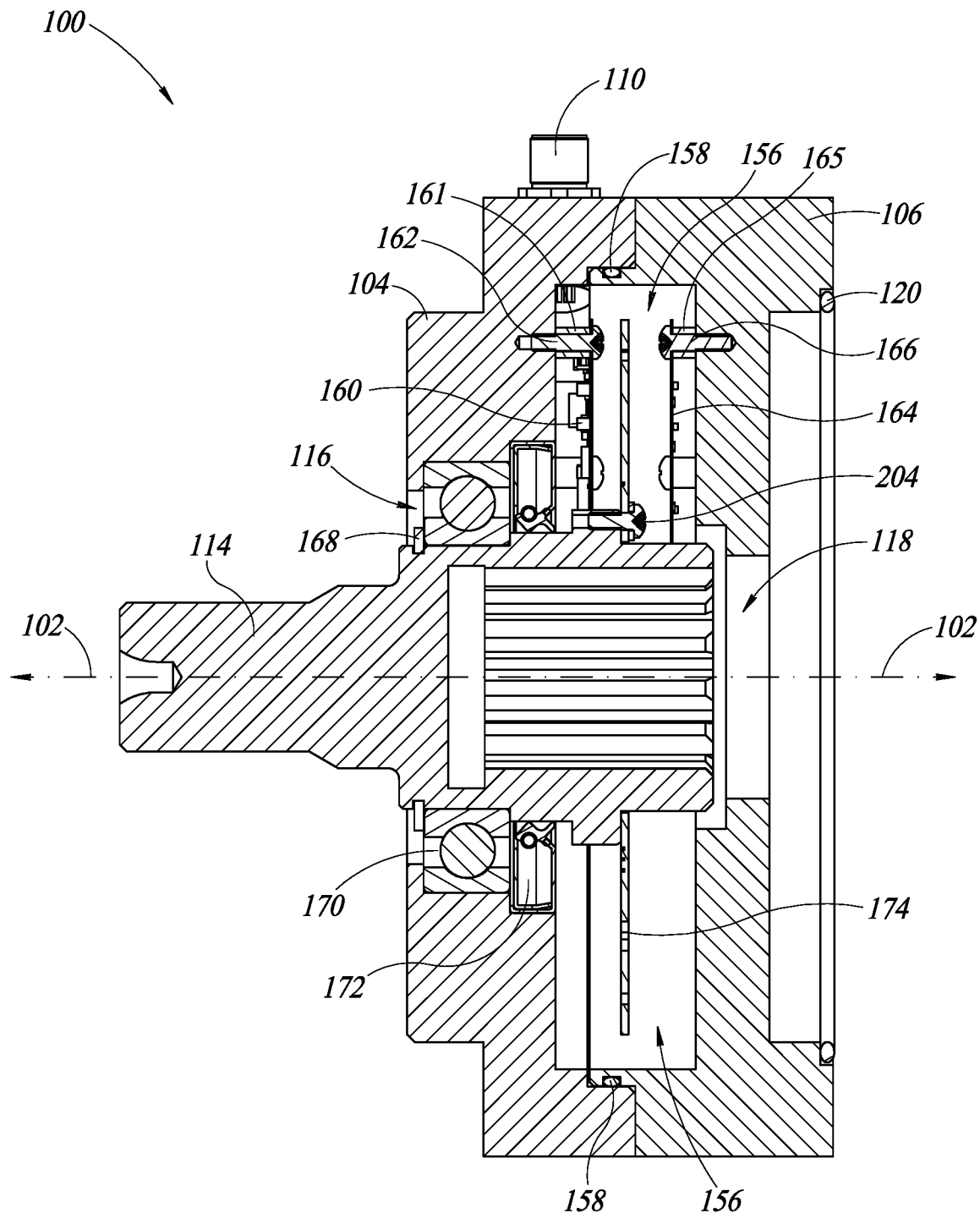
FIG. 3 is a cross-sectional view of the rotary encoder of FIG. 1, taken along line 3-3 in FIGS. 1 and 2.
Figure 4A:
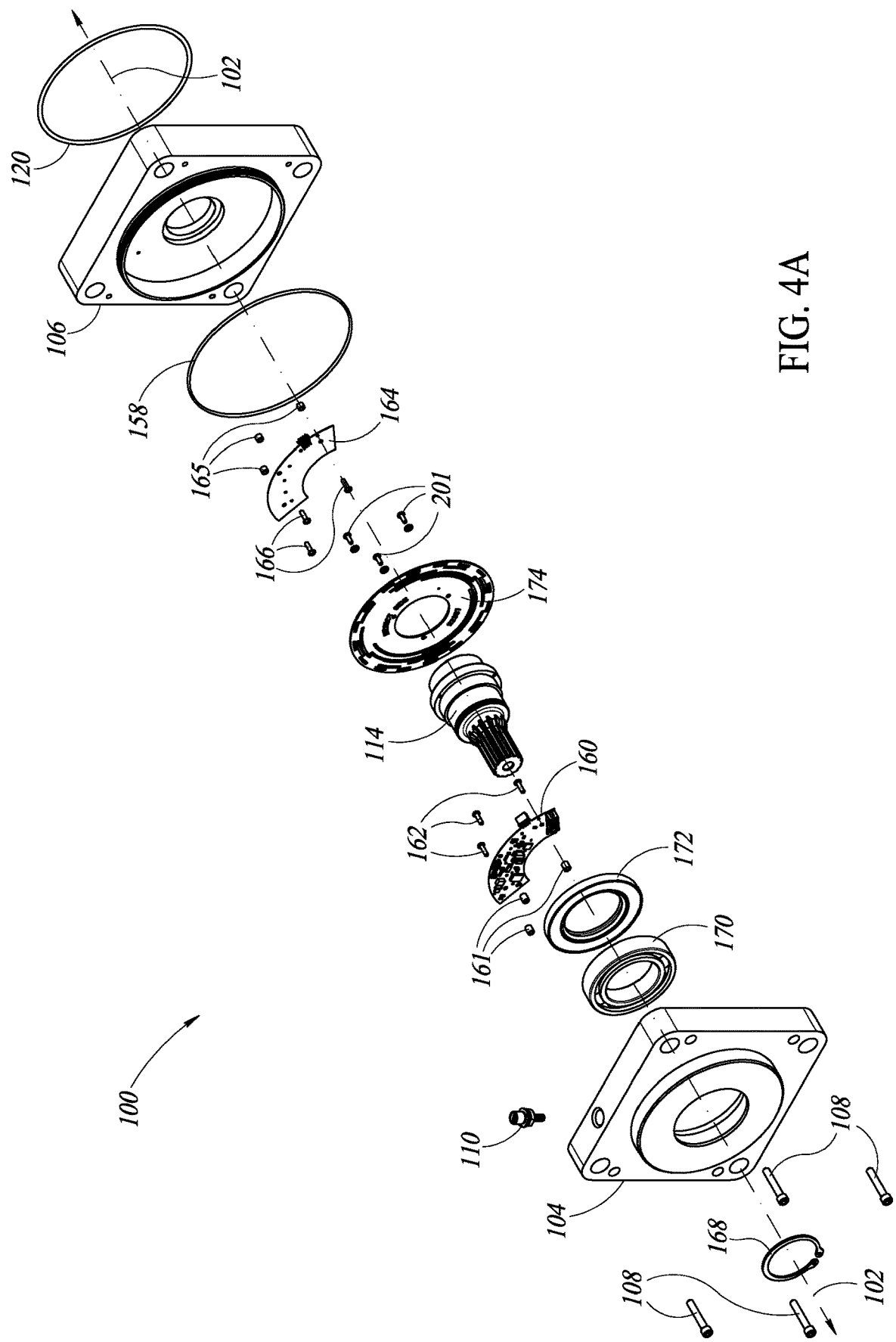
FIG. 4A is a perspective, exploded view of the rotary encoder of FIG. 1.
Figure 4B:
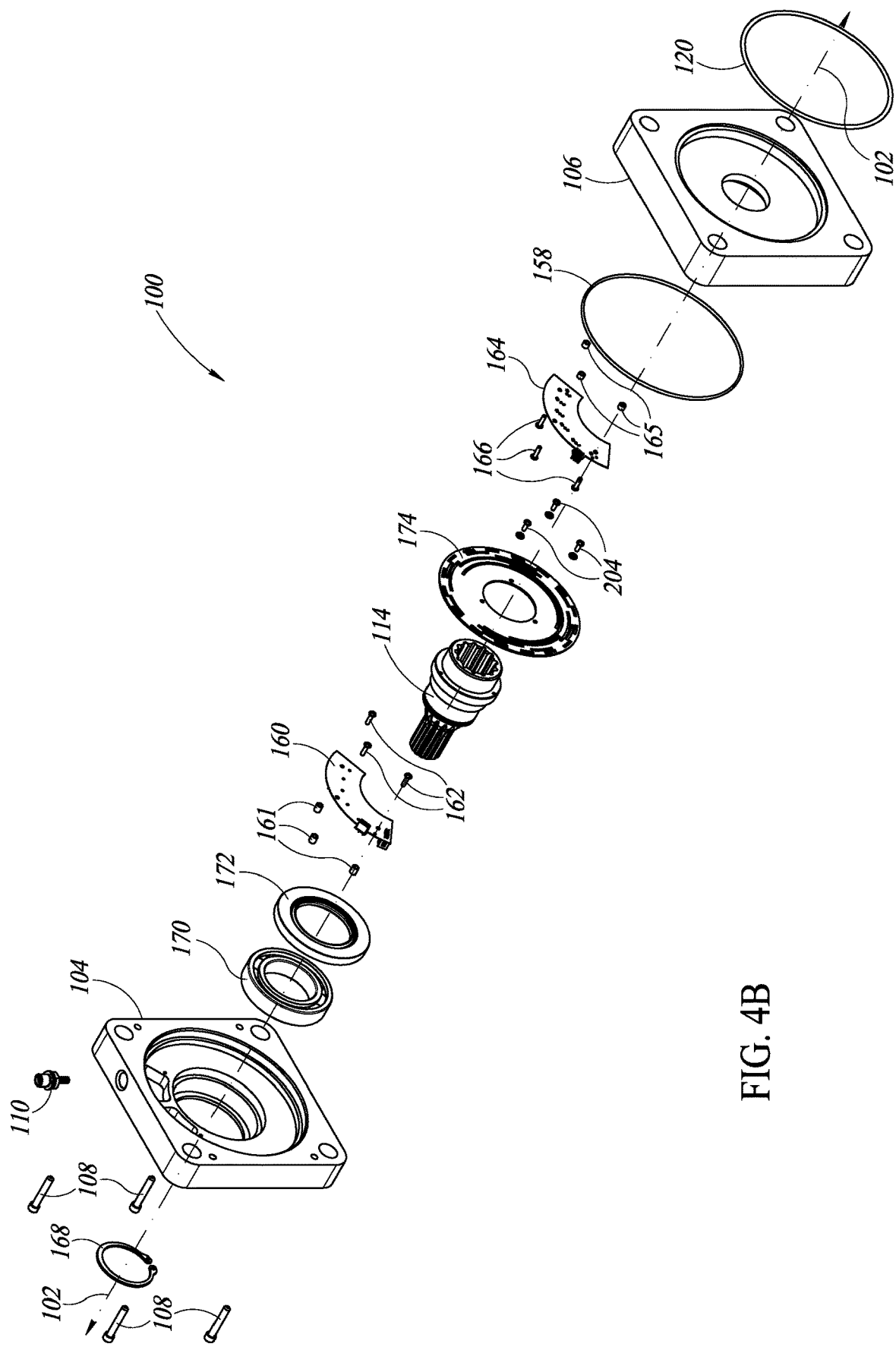
FIG. 4B is another perspective, exploded view of the rotary encoder of FIG. 1.
Figure 5:
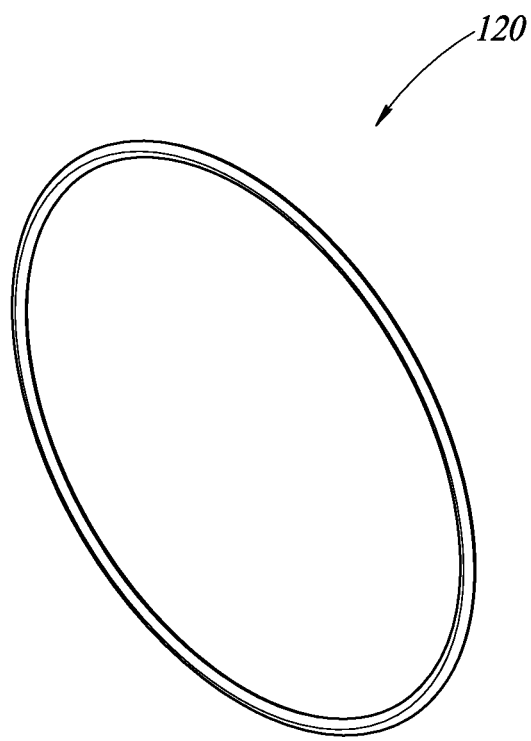
FIG. 5 is a perspective view of a gasket of the rotary encoder of FIG. 1.

FIG. 3 illustrates a cross-sectional view of the rotary encoder 100 taken along line 3-3 in FIGS. 1 and 2, with some of the features described with respect to FIGS. 1 and 2 illustrated therein. FIGS. 4A and 4B illustrate perspective, exploded views of the rotary encoder 100, with some of the features described with respect to FIGS. 1 and 2 illustrated therein. FIG. 5 illustrates a perspective view of the gasket 120. As illustrated in FIG. 5, the gasket 120 has an overall circular, annular shape. As illustrated in FIG. 2, the annular shape of the gasket 120 has a central longitudinal axis that is coincident with the central longitudinal axis 102. As noted above, the gasket 120 can seal the first major surface of the input-side portion 106 of the housing of the encoder 100 to a complementary, mating surface of another system, such as a hydraulic motor.

Figure 6:
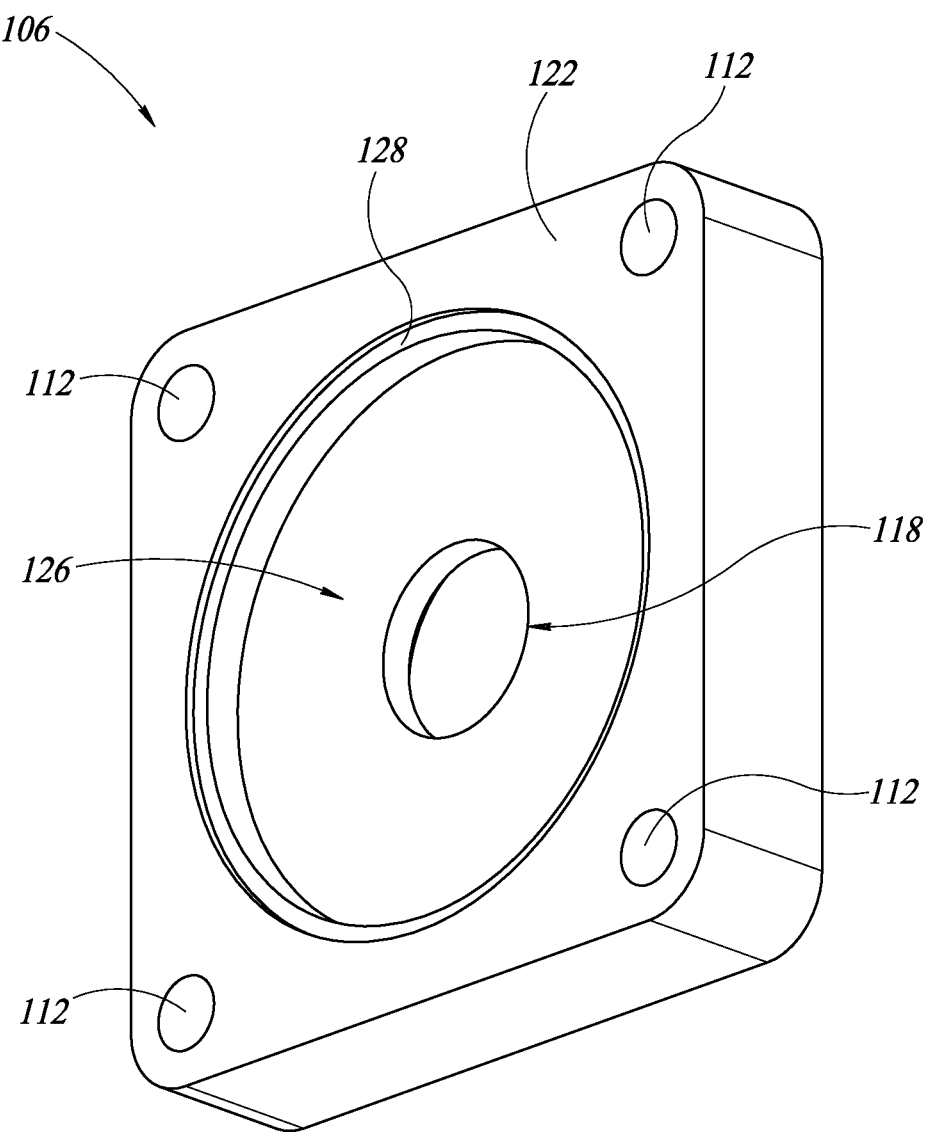
FIG. 6 is a perspective view of a first portion of a housing of the rotary encoder of FIG. 1.
Figure 7:
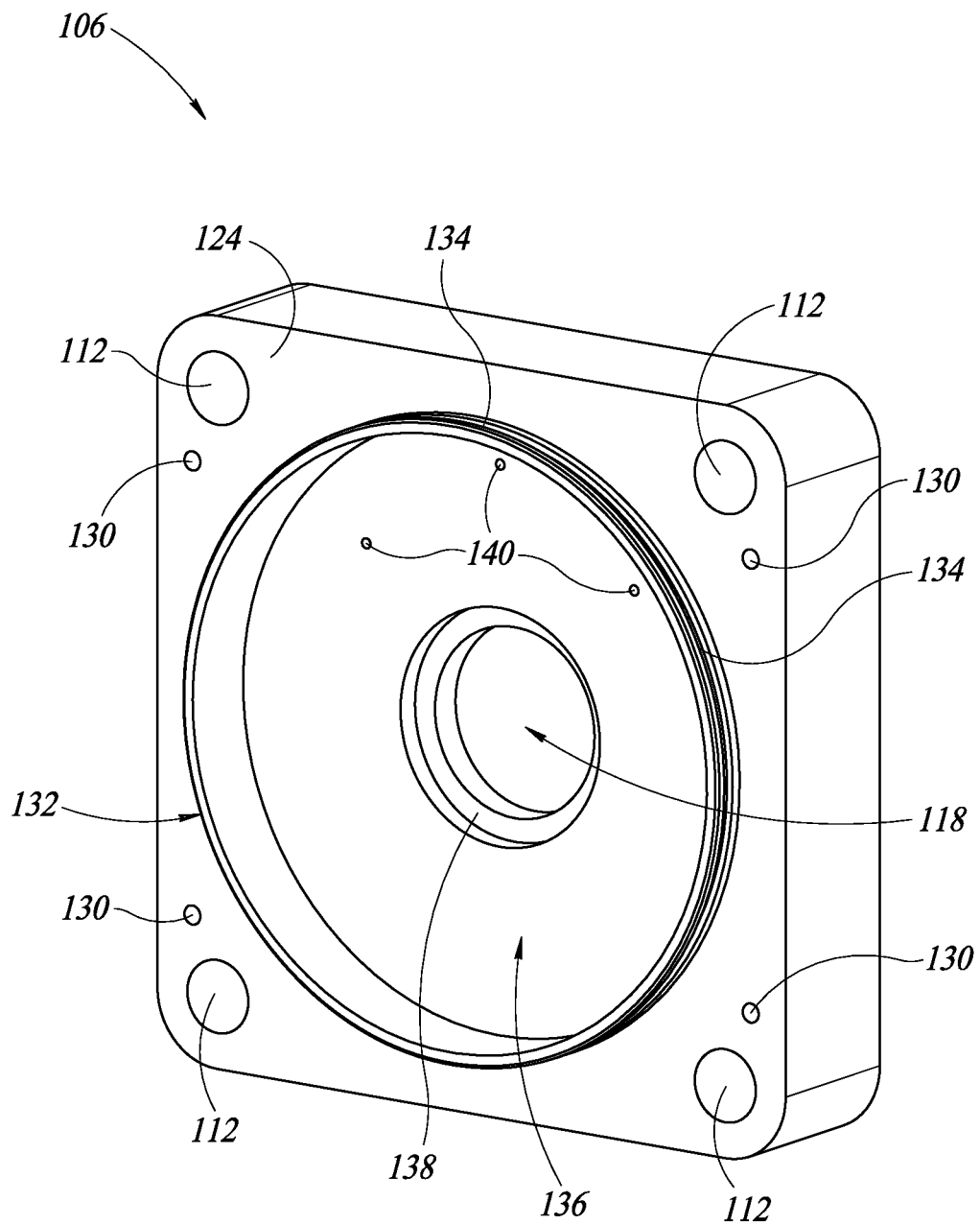
FIG. 7 is another perspective view of the first portion of the housing of the rotary encoder of FIG. 1.

FIGS. 6 and 7 illustrate different perspective views of the input-side portion 106 of the housing of the encoder 100, with the first major surface 122 of the input-side portion 106 visible in FIG. 6 and the second major surface 124 of the input side portion 106 visible in FIG. 7. As illustrated in FIG. 6, the input-side portion 106 of the housing of the encoder 100 includes a cylindrical recess 126 formed in the first major surface 122 thereof. The cylindrical recess 126 extends inward from the first major surface 122 partially toward the second major surface 124, and has a central longitudinal axis that is coincident with the central longitudinal axis 102. As also illustrated in FIG. 6, the aperture 118 extends from an inner end of the recess 126 nearest to the second major surface 124 completely through the input-side portion 106 to an inner end of a recess 136 formed in the second major surface 124, and has a central longitudinal axis that is coincident with the central longitudinal axis 102. As also illustrated in FIG. 6, the input-side portion 106 of the housing of the encoder 100 includes a circular groove 128 that extends around the recess 126 at a location where the recess 126 meets the first major surface 122. The groove 128 has a central longitudinal axis that is coincident with the central longitudinal axis 102, and has a shape and dimensions complementary to those of the gasket 120, such that the gasket 120 can be seated within the groove 128 to seal the first major surface 122 of the input-side portion 106 of the housing to another system or component, such as a hydraulic motor.

As illustrated in FIGS. 6 and 7, the input-side portion 106 of the housing of the rotary encoder 100 includes portions of the through-holes 112 that extend all the way through the input-side portion 106 from the first major surface 122 thereof to the second major surface 124 thereof. As illustrated in FIG. 7, the second major surface 124 of the input-side portion of the housing includes four bore holes 130, each positioned and configured, such as with internal threads, to receive a respective one of the mechanical fasteners 108, such that the fasteners 108 can be positioned within, such as threaded into, the bore holes 130 to secure the output-side portion 104 of the housing to the input-side portion 106 of the housing. As also illustrated in FIG. 7, the input-side portion 106 of the housing includes a circular, cylindrical, or annular ridge 132 that extends outward away from the second major surface 124 of the input-side portion 106. The input-side portion 106 of the housing also includes a groove 134 formed in and extending circumferentially around an outer surface of the annular ridge 132. The groove 134 can be configured to receive a circular or annular seal therein, as described further elsewhere herein.

As also illustrated in FIG. 7, the input-side portion 106 of the housing includes a cylindrical recess 136 formed in the second major surface 124 thereof. At least a portion, such as an axially outermost portion farthest from the first major surface 122 of the input-side portion 106 of the housing, of a radially outer cylindrical periphery, surface, or edge of the cylindrical recess is defined by an inner cylindrical surface of the annular ridge 132. The cylindrical recess 136 extends inward from the second major surface 124 partially toward the first major surface 122, and has a central longitudinal axis that is coincident with the central longitudinal axis 102.

As also illustrated in FIG. 7, the input-side portion 106 includes a circular groove 138 that extends around the aperture 118 at a location where the recess 136 meets the aperture 118. The groove 138 has a central longitudinal axis that is coincident with the central longitudinal axis 102. As also illustrated in FIG. 7, the input-side portion 106 includes three bore holes 140 that extend into an end of the recess 136 closest to the first major surface 122 along respective axes parallel to the central longitudinal axis 102. Each of the three bore holes 140 is positioned and configured, such as with internal threads, to receive a respective mechanical fastener, such that the fasteners can be positioned within, such as threaded into, the bore holes 140 to secure other components, such as electronic components of the encoder 100, thereto.

Figure 8:
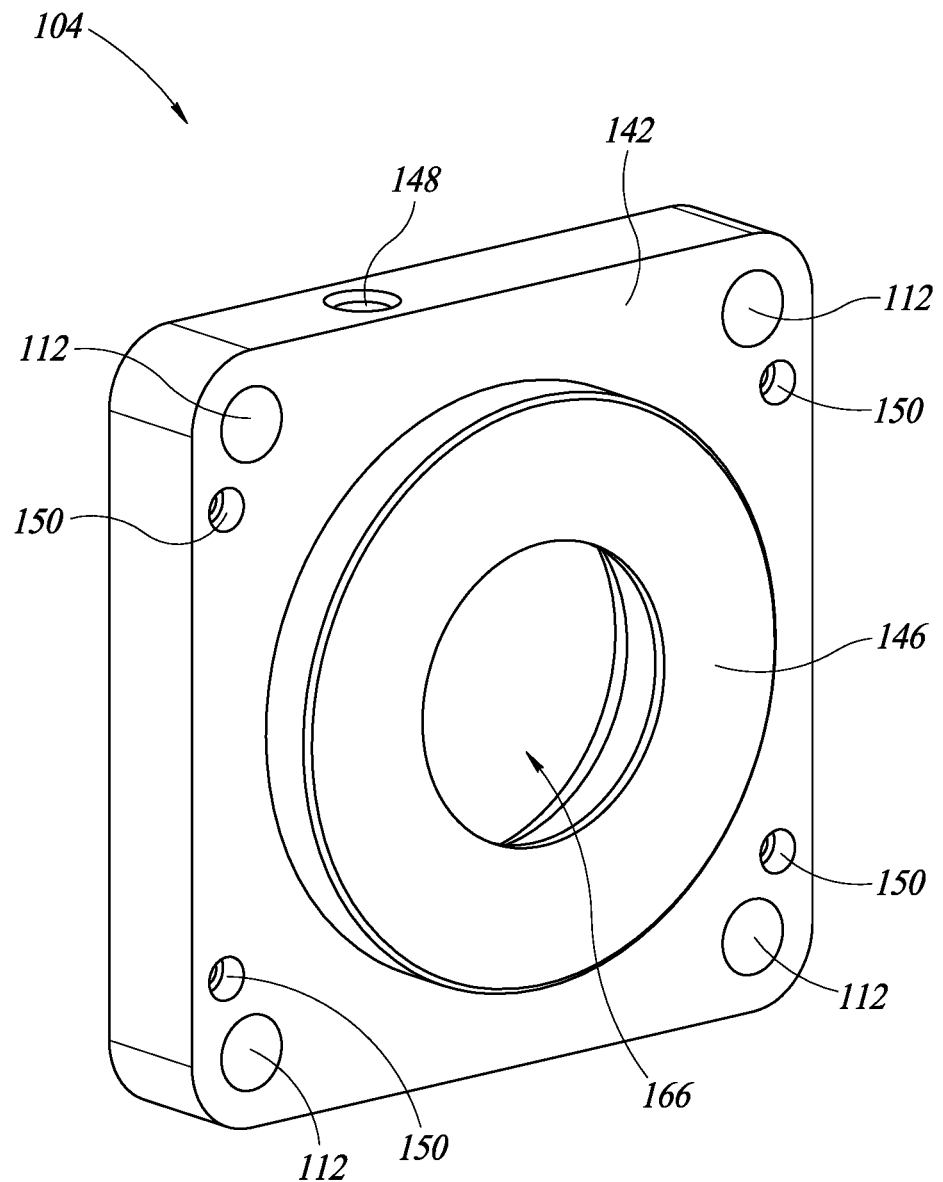
FIG. 8 is a perspective view of a second portion of a housing of the rotary encoder of FIG. 1.
Figure 9:
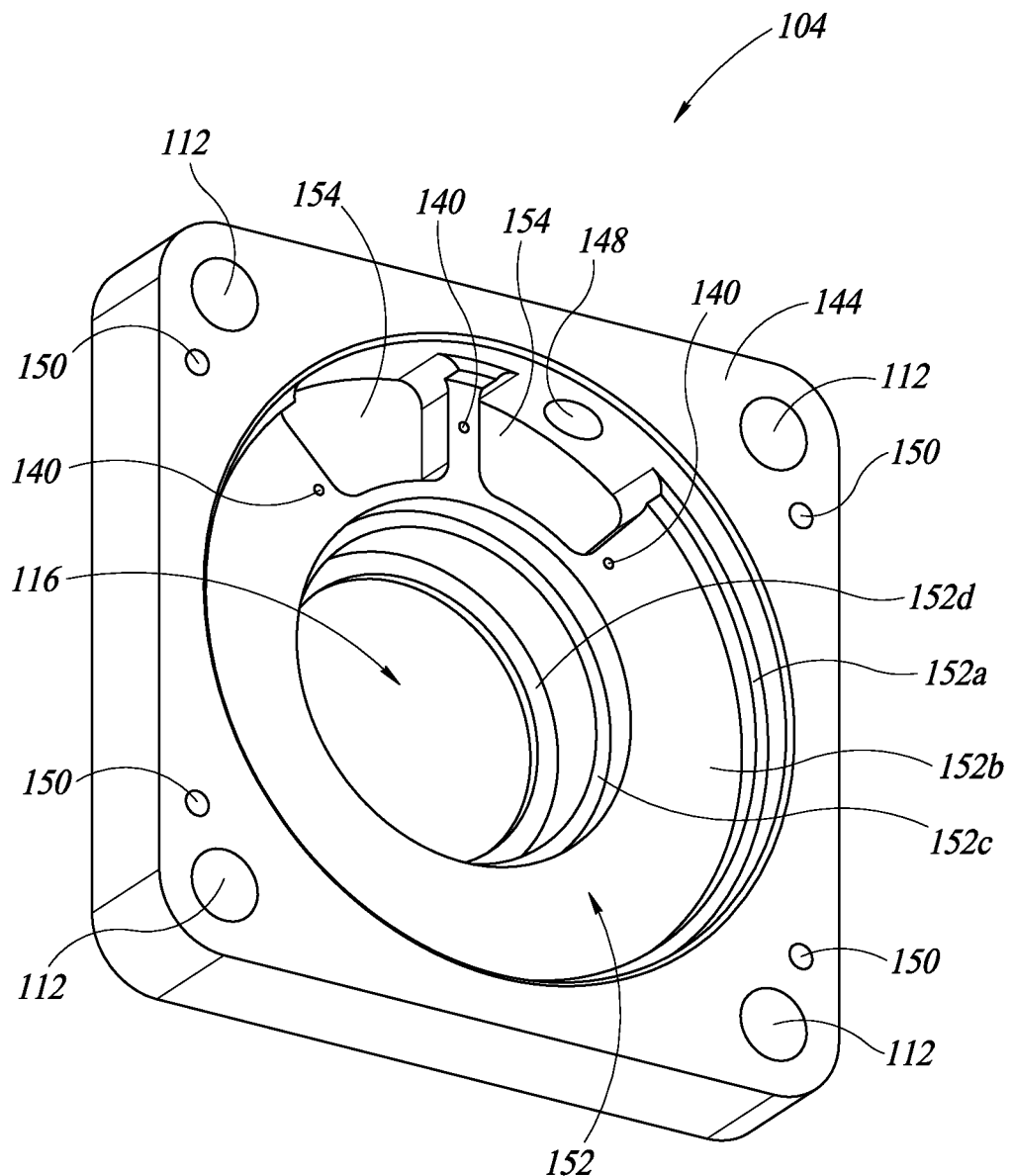
FIG. 9 is another perspective view of the second portion of the housing of the rotary encoder of FIG. 1.

FIGS. 8 and 9 illustrate different perspective views of the output-side portion 104 of the housing of the encoder 100, with the first major surface 142 of the output-side portion 104 visible in FIG. 8 and the second major surface 144 of the output side portion 104 visible in FIG. 9. As illustrated in FIG. 8, the output-side portion 104 of the housing of the encoder 100 includes a circular or cylindrical protrusion 146 that extends outward with respect to the first major surface 142. The protrusion 146 has a central longitudinal axis that is coincident with the central longitudinal axis 102. As illustrated in FIGS. 8 and 9, the aperture 116 extends from an outer end of the protrusion 146 farthest from the first major surface 142 and farthest from the second major surface 144 completely through the output-side portion 104 to an inner end of a recess 152 formed in the second major surface 144, and has a central longitudinal axis that is coincident with the central longitudinal axis 102. As also illustrated in FIGS. 8 and 9, the output-side portion 104 includes an aperture or a bore hole 148 that extends from one of the outer, peripheral side surfaces of the output-side portion 104 to an internal cavity formed therein. As illustrated and described elsewhere herein, the electrical connector 110 can extend through the bore hole 148 to electrically couple electric or electronic components inside the encoder 100 to electric or electronic components outside the encoder 100.

As also illustrated in FIGS. 8 and 9, the output-side portion 104 of the housing of the rotary encoder 100 includes portions of the through-holes 112 that extend all the way through the output-side portion 104 from the first major surface 142 thereof to the second major surface 144 thereof. As illustrated in FIGS. 8 and 9, the output-side portion 104 of the housing includes four through holes or bore holes 150, each positioned and configured, such as with internal threads, to receive a respective one of the mechanical fasteners 108, such that the fasteners 108 can be positioned within, such as threaded into, and extend all the way through, the bore holes 150 to secure the output-side portion 104 of the housing to the input-side portion 106 of the housing.

As illustrated in FIG. 9, the output-side portion 104 of the housing includes a cylindrical recess 152 formed in the second major surface 144 thereof. The cylindrical recess 152 extends inward from the second major surface 144 partially toward the first major surface 142, and has a central longitudinal axis that is coincident with the central longitudinal axis 102. The cylindrical recess 152 has a staggered diameter that decreases in steps as it extends from the second major surface 144 toward the first major surface 142. More specifically, the cylindrical recess 152 has a first portion 152a immediately adjacent the second major surface 144 that has a first diameter corresponding to an outer diameter of the annular ridge 132 so that the annular ridge 132 can be seated snugly therein, a second portion 152b immediately adjacent the first portion 152a that has a second diameter smaller than the first diameter, a third portion 152c immediately adjacent the second portion 152b that has a third diameter smaller than the second diameter, and a fourth portion 152d immediately adjacent the third portion 152c that has a fourth diameter smaller than the third diameter.

As also illustrated in FIG. 9, the output-side portion 104 includes three bore holes 140 that extend into an end of the recess 152 closest to the first major surface 142 along respective axes parallel to the central longitudinal axis 102. Each of the three bore holes 140 is positioned and configured, such as with internal threads, to receive a respective mechanical fastener, such that the fasteners can be positioned within, such as threaded into, the bore holes 140 to secure other components, such as electronic components of the encoder 100, thereto. As also illustrated in FIG. 9, the output-side portion 104 includes two depressions 154 formed within the recess 152, each of which extends further inward into radially-extending surfaces of the first and second portions 152a, 152b of the recess 152 at a radially-outermost edge of the recess 152. One of the depressions 154 is positioned adjacent to an internal opening of the bore hole 148 that opens into an internal cavity of the encoder 100, to provide additional space for electrical connectors to extend through the bore hole 148 and into the internal cavity.

Figure 10:
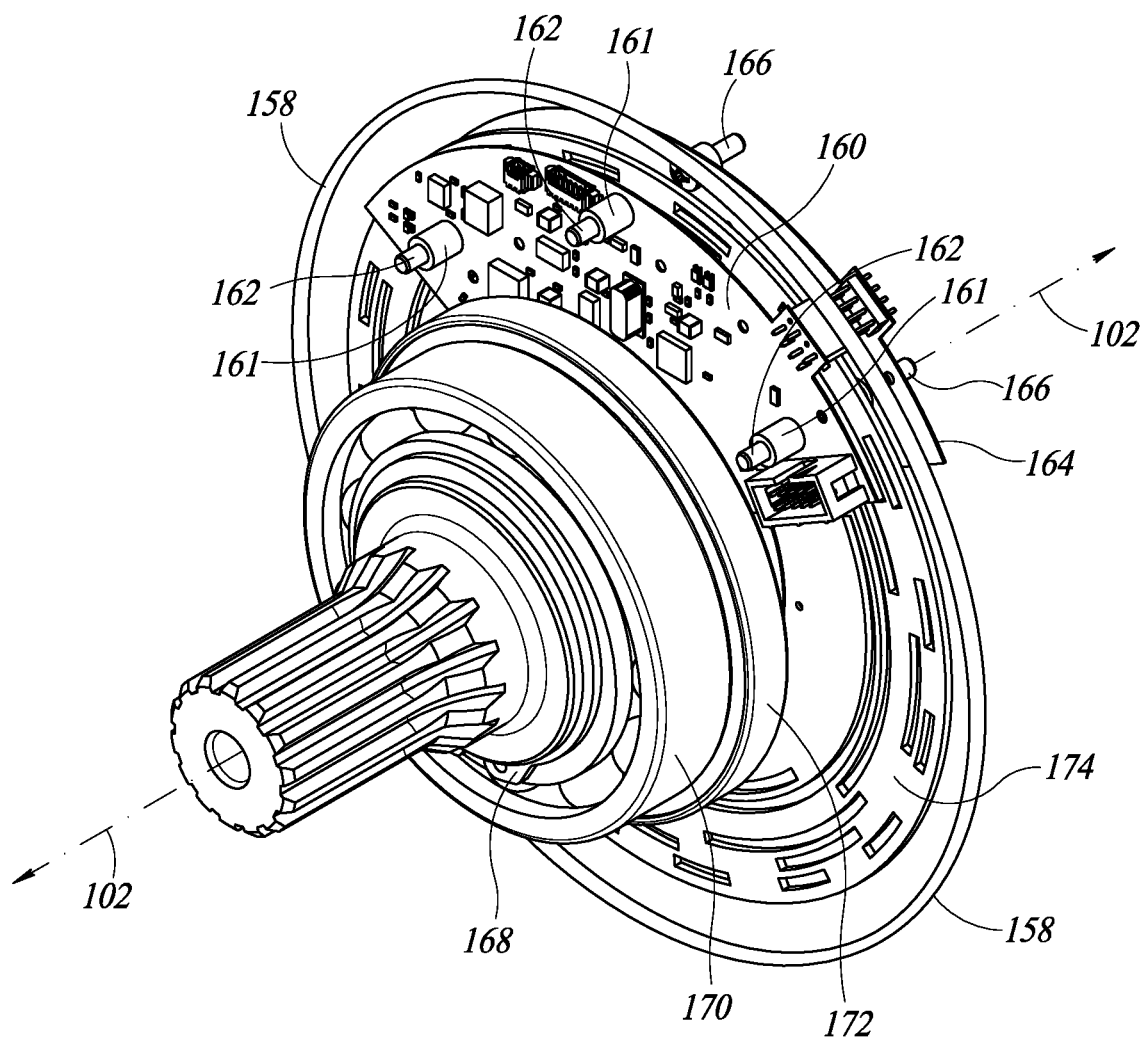
FIG. 10 is a perspective view of the rotary encoder of FIG. 1 with the gasket of FIG. 5 and the first and second portions of the housing of FIGS. 6-9 removed to illustrate internal components thereof.

The cross-sectional view of the rotary encoder 100 illustrated in FIG. 3 shows that when the output-side portion 104 of the housing of the encoder 100 is coupled to the input-side portion 106 thereof, the recess 136 formed in the input-side portion 106 and the recess 152 formed in the output-side portion 104 are coupled and joined to one another such that they collectively form an internal cavity 156 within the housing. The cross-sectional view of FIG. 3 also shows a variety of additional components located within the internal cavity 156. FIG. 10 illustrates a first perspective view, and FIG. 11 illustrates a second perspective view, of the internal components of the rotary encoder 100 that are positioned within the internal cavity 156 when the encoder 100 is in use.

Figure 11:
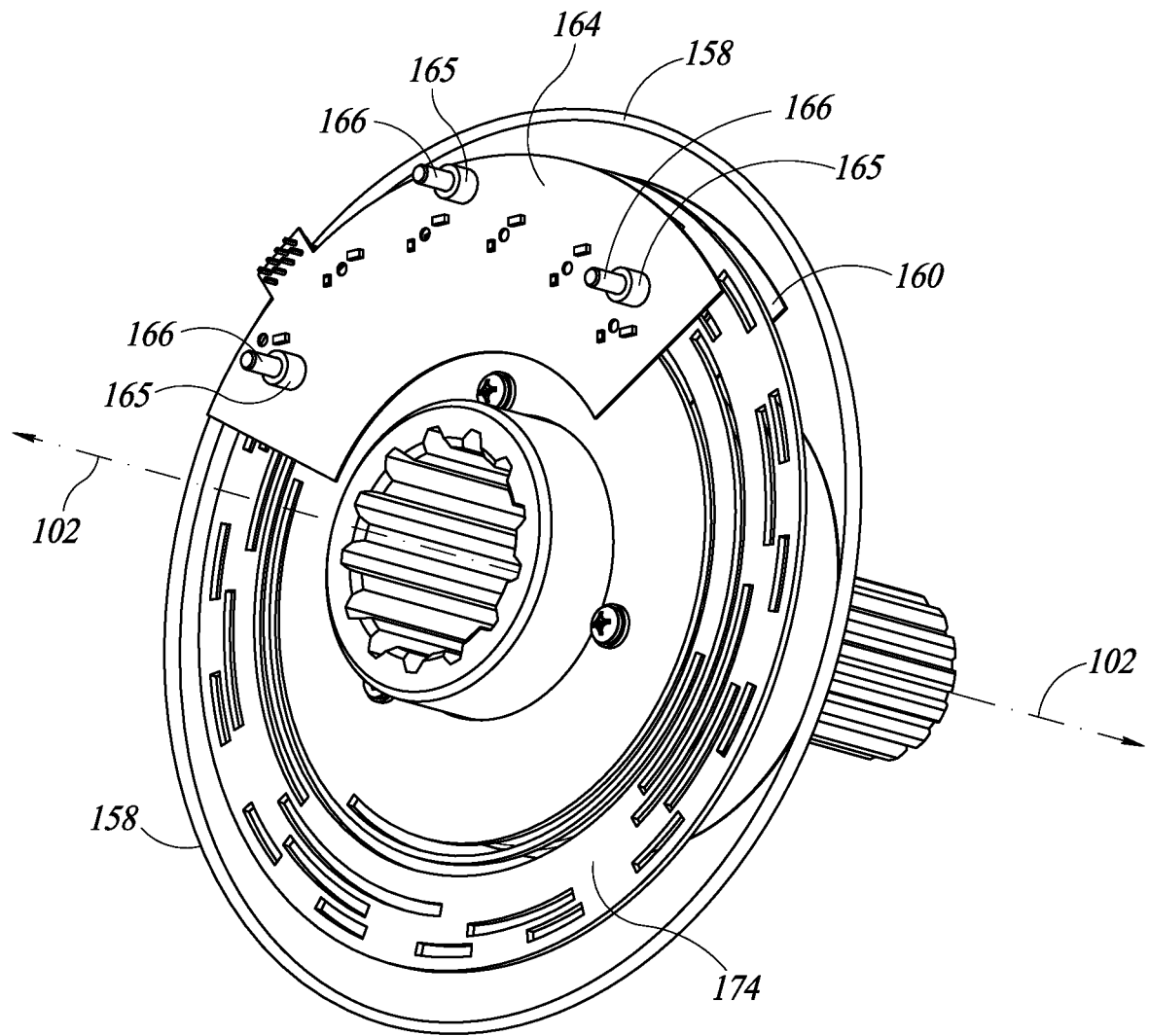
FIG. 11 is another perspective view of the rotary encoder of FIG. 1 with the gasket of FIG. 5 and the first and second portions of the housing of FIGS. 6-9 removed to illustrate internal components thereof.

As illustrated in FIGS. 10 and 11, internal components of the rotary encoder 100 include an outer seal or gasket 158 that can seal a surface of the output-side portion 104 of the housing to a complementary surface of the input-side portion 106, thereby creating a fluid-tight, water-tight, and gas-tight seal therebetween, to protect the internal cavity 156 against intrusion of dust, debris, and fluids from outside the encoder 100. For example, the outer gasket 158 can have a shape and dimensions complementary to those of the groove 134 formed in and extending circumferentially around an outer surface of the annular ridge 132 of the input-side portion 106, such that the gasket 158 can be seated within the groove 134 to seal the outer surface of the annular ridge 132 to a longitudinally-extending and radially-facing surface of the first portion 152a of the cylindrical recess 152 formed in the second major surface 144 of the output-side portion 104. As illustrated in FIGS. 10 and 11, the gasket 158 has an overall circular, annular shape, and the annular shape of the gasket 158 has a central longitudinal axis that is coincident with the central longitudinal axis 102.

As also illustrated in FIGS. 10 and 11, internal components of the rotary encoder 100 include an output-side printed circuit board 160 having a variety of electrical or electronic components such as photodiodes and/or LEDs formed thereon or coupled thereto, three mechanical fasteners 162, which may be bolts or screws, for coupling the output-side printed circuit board 160 to the output-side portion 104 of the housing, three spacers or stand-off elements 161, an input-side printed circuit board 164 having a variety of electrical or electronic components such as photodiodes and/or LEDs formed thereon or coupled thereto, three mechanical fasteners 166, which may be bolts or screws, for coupling the input-side printed circuit board 164 to the input-side portion 106 of the housing, and three spacers or stand-off elements 165. The cross-sectional view of the rotary encoder 100 illustrated in FIG. 3 shows that the fasteners 162 can extend through the printed circuit board 160, through the stand-off elements 161 to keep the printed circuit board 160 separated from the output-side portion 104 of the housing, and into the three bore holes 140 that extend into the end of the recess 152 of the output-side portion 104 of the housing to secure the printed circuit board 160 and other components mounted thereon to the output-side portion 104 of the housing. In some implementations, the fasteners 162 can be secured within the bore holes 140 by being threaded into internal threads thereof. The cross-sectional view of the rotary encoder 100 illustrated in FIG. 3 also shows that the fasteners 166 can extend through the printed circuit board 162, through the stand-off elements 165 to keep the printed circuit board 162 separated from the input-side portion 106 of the housing, and into the three bore holes 140 that extend into the end of the recess 136 of the input-side portion 106 of the housing to secure the printed circuit board 164 and other components mounted thereon to the input-side portion 106 of the housing. In some implementations, the fasteners 166 can be secured within the bore holes 140 by being threaded into internal threads thereof.

As also illustrated in FIGS. 10 and 11, internal components of the rotary encoder 100 further include a retaining ring 168, a ball bearing or a roller bearing 170, a seal 172, a rotary encoder disc 174, and the central shaft 114, each of which is described in greater detail with respect to FIGS. 12, 13, 14, 15, and 16-17, respectively. As shown in FIGS. 10 and 11, the retaining ring 168 has a generally circular or ring-like shape having a central longitudinal axis coincident with the central longitudinal axis 102, the ball bearing 170 has a central longitudinal axis coincident with the central longitudinal axis 102, the seal 172 has a central longitudinal axis coincident with the central longitudinal axis 102, the encoder disc 174 has a central longitudinal axis coincident with the central longitudinal axis 102, and the central shaft 114 has a central longitudinal axis coincident with the central longitudinal axis 102.

Figure 12:
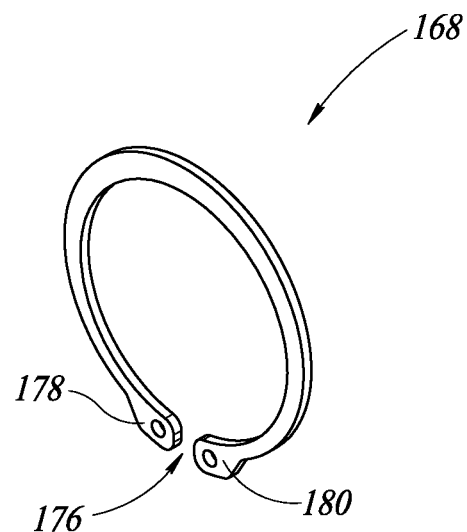
FIG. 12 is a perspective view of a retaining ring of the rotary encoder of FIG. 1.

FIG. 12 illustrates the retaining ring separated from the rest of the encoder 100, to illustrate its features more clearly. As illustrated in FIG. 12, the retaining ring 168 has a generally circular shape, or a shape generally comprising a ring, with a gap 176 such that the ring does not extend a full 360 degrees. Thus, the retaining ring 168 can be bent or otherwise manipulated more easily, such as during installation of the retaining ring 168 or during assembly of the encoder 100. The retaining ring 168 has a generally constant cross-sectional profile along its length from a first end 178 thereof at a first side of the gap 176 to a second end 180 thereof at a second side of the gap 176 opposite to the first. The first end 178 and the second end 180 of the retaining ring 168 each have cross-sectional shapes that are larger than the generally constant cross-sectional profile of the rest of the retaining ring 168, and each have an aperture extending therethrough along respective axes that are parallel to the central longitudinal axis 102.

Figure 13:
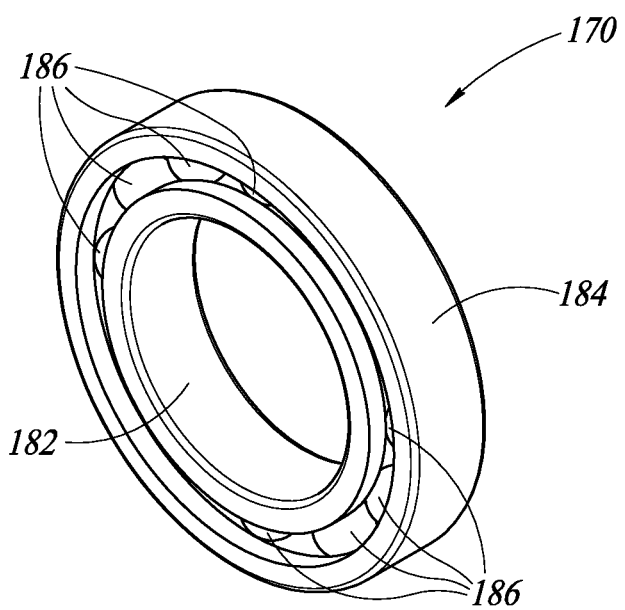
FIG. 13 is a perspective view of a ball bearing of the rotary encoder of FIG. 1.
Figure 14:
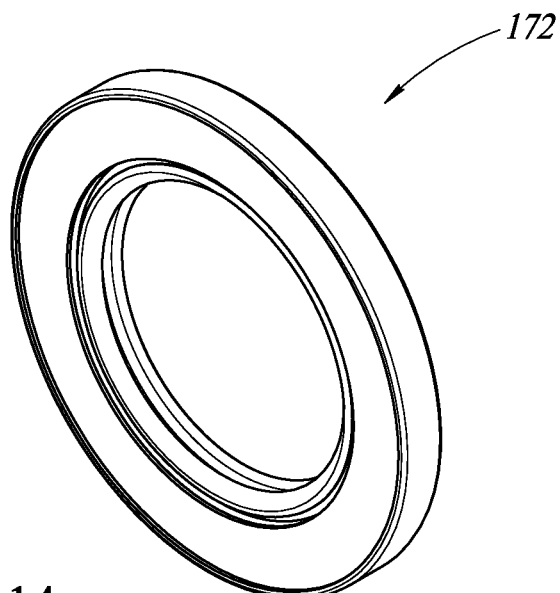
FIG. 14 is a perspective view of a seal of the rotary encoder of FIG. 1.

FIG. 13 illustrates the ball bearing 170 separated from the rest of the encoder 100, to illustrate its features more clearly. As illustrated in FIG. 13, the ball bearing 170 includes a generally cylindrical inner race 182, a generally cylindrical outer race 184 that extends circumferentially around the inner race 182, and a plurality of ball bearings 186 positioned between the inner race 182 and the outer race 184 and seated within grooves formed in the inner race 182 and the outer race 184. The ball bearing 170 has an outer diameter that corresponds to an inner diameter of the fourth portion 152d of the recess 152 such that the ball bearing 170 can fit snugly therein. FIG. 14 illustrates the seal 172 separated from the rest of the encoder 100, to illustrate its features more clearly. As illustrated in FIG. 14, the seal 172 has an overall circular, annular shape. The seal 172 has an outer diameter that corresponds to an inner diameter of the third portion 152c of the recess 152 such that the seal 172 can fit snugly therein.

Figure 15:
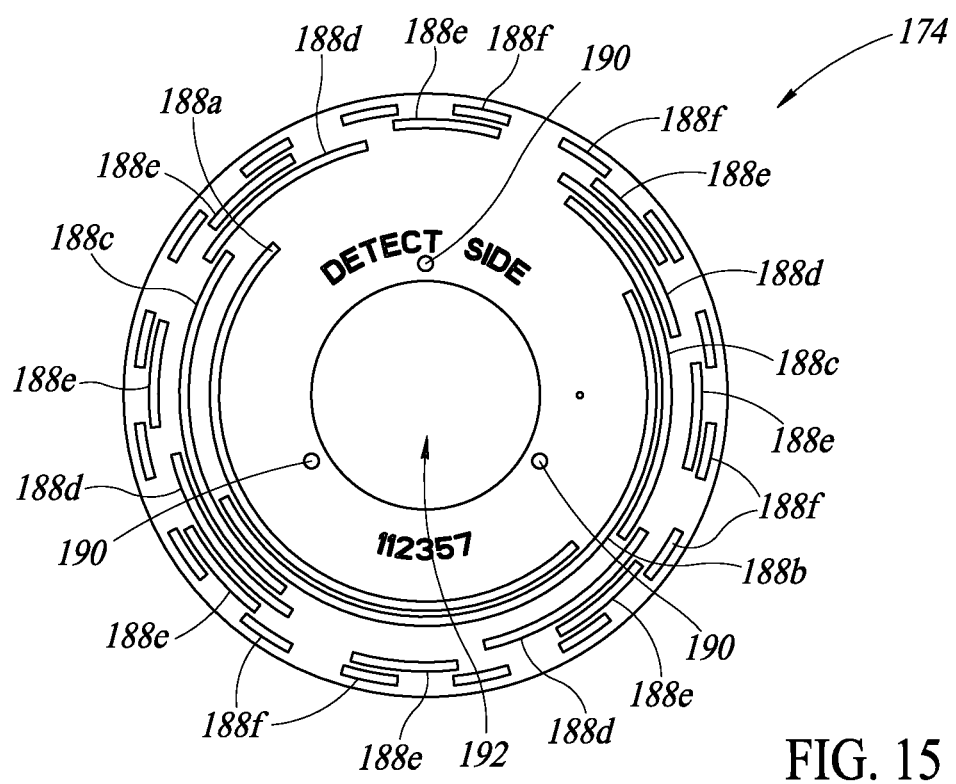
FIG. 15 is an axial view of a disc of the rotary encoder of FIG. 1.

FIG. 15 illustrates an end view, or a longitudinal view, or an axial view of the encoder disc 174 separated from the rest of the encoder 100, to illustrate its features more clearly. As illustrated in FIG. 15, the encoder disc 174 has a generally cylindrical overall shape with a first major surface, shown end-on in FIG. 15, a second major surface opposite and parallel to the first, and a circular or cylindrical outer surface that extends from the first major surface to the second major surface. The encoder disc 174 is opaque and has a plurality of slits or slots 188 formed therein that extend through the encoder disc 174 from the first major surface thereof to the second major surface thereof along respective axes that are parallel to the central longitudinal axis 102. While the encoder disc 174 described herein is opaque with a plurality of slots 188, in other implementations, the encoder disc 174 may alternatively be transparent or translucent and have stickers or other components affixed thereto to form a pattern matching that of the slots 188 described herein. Further, while the encoder disc 174 described herein is opaque with a plurality of open slots 188, in other implementations, any or all of the slots 188 may alternatively include transparent or translucent windows therein, such that they are not open from one major surface of the encoder disc 174 to the other.

As illustrated in FIG. 15, the slots 188 are arranged so they form six concentric partial rings extending circumferentially around the center of the encoder disc 174 and about the central longitudinal axis 102. In particular, a first set of slots 188a are arranged to form a first, innermost partial ring, a second set of slots 188b are arranged to form a second partial ring that extends about the first, innermost partial ring, a third set of slots 188c are arranged to form a third partial ring that extends about the second partial ring, a fourth set of slots 188d are arranged to form a fourth partial ring that extends about the third partial ring, a fifth set of slots 188e are arranged to form a fifth partial ring that extends about the fourth partial ring, and a sixth set of slots 188f are arranged to form a sixth, outermost partial ring that extends about the fifth partial ring.

As illustrated in FIG. 15, the first set of slots 188a includes a single slot 188a that extends about halfway (e.g., 180 degrees) around the center of the encoder disc 174 and about the central longitudinal axis 102, the second set of slots 188b includes a single slot 188b that extends about halfway (e.g., 180 degrees) around the center of the encoder disc 174 and about the central longitudinal axis 102, the third set of slots 188c includes two slots 188c that each extend about one quarter of the way (e.g., 90 degrees) around the center of the encoder disc 174 and about the central longitudinal axis 102 and that are spaced apart from one another by a distance about the same as their length, the fourth set of slots 188d includes four slots 188d that each extend about one eighth of the way (e.g., 45 degrees) around the center of the encoder disc 174 and about the central longitudinal axis 102 and that are spaced apart from one another by a distance about the same as their length, the fifth set of slots 188e includes eight slots 188e that each extend about one sixteenth of the way (e.g., 22.5 degrees) around the center of the encoder disc 174 and about the central longitudinal axis 102 and that are spaced apart from one another by a distance about the same as their length, and the sixth set of slots 188f includes sixteen slots 188f that each extend about one thirty-second of the way (e.g., 11.25 degrees) around the center of the encoder disc 174 and about the central longitudinal axis 102 and that are spaced apart from one another by a distance about the same as their length.

The slots 188 are configured to be readable and to be read by electronic, conductive, optical, magnetic, or mechanical components mounted on one or more of the printed circuit boards 160 and 164, such that the electrical or electronic components thereof can determine a position, a direction of movement or rotation, or a rotational speed of the encoder disc 174 with respect to the housing of the encoder 100, and output electrical signals corresponding thereto. In various implementations, the specific configuration of the slots 188 can be configured or optimized for use as an absolute encoder disc or as an incremental encoder disc. As also illustrated in FIG. 15, the encoder disc 174 has a central opening or aperture 192 that extends through the encoder disc 174 from the first major surface thereof to the second major surface thereof along an axis coincident with the central longitudinal axis 102. As also illustrated in FIG. 15, the encoder disc 174 has three apertures or through-holes 190 that extend through the encoder disc 174 from the first major surface thereof to the second major surface thereof along respective axes that are parallel to the central longitudinal axis 102. The through-holes 190 allow an operator to couple the encoder disc 174 to other components, such as the central shaft 114, such as with bolts, screws, or other fasteners that extend through the through-holes 190, as described further elsewhere herein.

Figure 16:
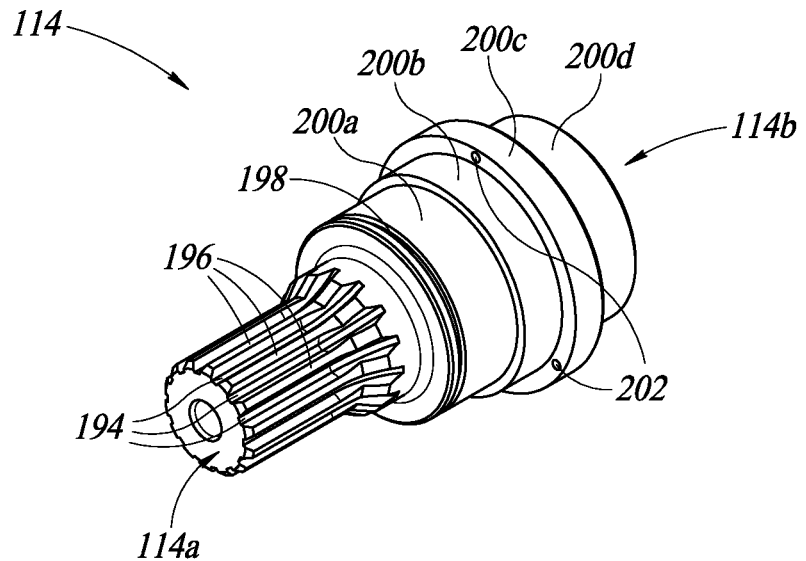
FIG. 16 is a perspective view of a central shaft of the rotary encoder of FIG. 1.
Figure 17:
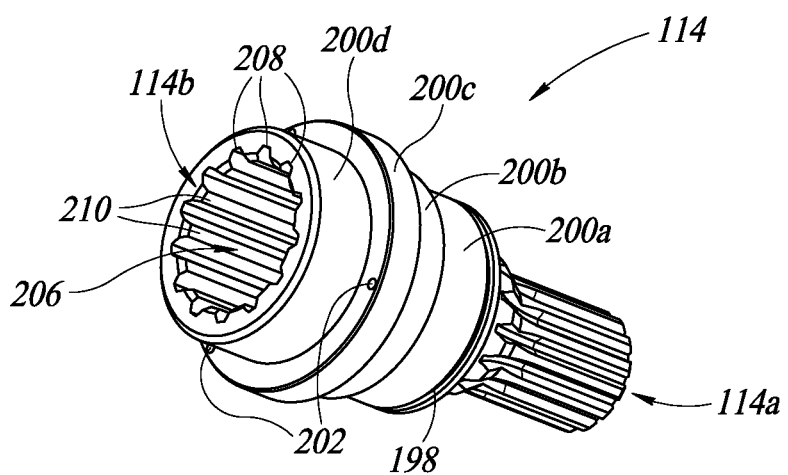
FIG. 17 is another perspective view of the central shaft of the rotary encoder of FIG. 1.

FIGS. 16 and 17 illustrate different perspective views of the central shaft 114 separated from the rest of the encoder 100, to illustrate its features more clearly. As illustrated in FIGS. 16 and 17, the output-side end portion 114a of the central shaft 114, which includes half, about half, or a little less than half of the length of the central shaft 114 along the central longitudinal axis 102, has an outer surface including a plurality of alternating grooves 194, which extend axially or longitudinally along the length of the central shaft 114 in respective directions parallel to the central longitudinal axis 102, and ridges 196, which extend axially or longitudinally along the length of the central shaft 114 in respective directions parallel to the central longitudinal axis 102. The grooves 194 and ridges 196 provide a set of spline teeth to which another component, such as an input shaft of a winch, a hoist, or a pump can be coupled. The spline teeth formed by the grooves 194 and ridges 196 can engage with complementary spline teeth formed in the input shaft of the other component to rotationally lock the input shaft of the other component to the central shaft 114. The spline teeth formed by the grooves 194 and ridges 196 can be provided in a variety of dimensions based on the dimensions of the central shaft 114, and can be configured in accordance with relevant Society of Automotive Engineers (SAE), ISO, or other relevant standards for spline teeth. While the grooves 194 and ridges 196 described herein provide a set of spline teeth, in other implementations, the grooves 194 and ridges 196 may alternatively provide a keyed shaft, such as for mating to the input shaft of the other component.

As also illustrated in FIGS. 16 and 17, the input-side end portion 114b of the central shaft 114, which includes half, about half, or a little more than half of the length of the central shaft 114 along the central longitudinal axis 102, has an outer surface that is substantially larger in diameter than the outer surface of the output-side end portion 114a of the central shaft 114. The input-side end portion 114b of the central shaft 114 has an outer surface 200 having a stepped outer diameter, with a first portion 200a of the outer surface 200 adjacent the output-side end portion 114a having a first outer diameter, a second portion 200b of the outer surface 200 adjacent the first portion 200a having a second outer diameter greater than the first outer diameter, a third portion 200c of the outer surface 200 adjacent the second portion 200b having a third outer diameter greater than the second outer diameter, and a fourth portion 200d of the outer surface 200 adjacent the third portion 200c having a fourth outer diameter smaller than the second and third outer diameters and about the same as the first outer diameter.

The outer surface 200 of the input-side end portion 114b of the central shaft 114 also has a circumferential groove 198 formed in the first portion 200a of the outer surface 200 proximate the output-side end portion 114a. The groove 198 has a central longitudinal axis that is coincident with the central longitudinal axis 102, and has a shape and dimensions complementary to those of the retaining ring 168, such that the retaining ring 168 can be seated within the groove 198 to secure or retain other components, such as the ball bearing 170 and the seal 172, on the central shaft 114. For example, an inner cylindrical surface of the seal 172 can have a diameter corresponding to the diameter of the second portion 200b of the outer surface 200 of the input-side end portion 114b of the central shaft, and can be positioned thereon when the encoder 100 is in use. As another example, an inner cylindrical surface of the ball bearing 170 can have a diameter corresponding to the diameter of the first portion 200a of the outer surface 200 of the input-side end portion 114b of the central shaft 114, and can be positioned thereon when the encoder 100 is in use. In such implementations, the retaining ring 168 can be installed within the groove 198 to retain the ball bearing 170 and the seal 172 on the central shaft 114 when the encoder 100 is in use.

As also illustrated in FIGS. 16 and 17, the input-side end portion 114b of the central shaft 114 also has three apertures or through-holes 202, which may be threaded, that extend through the central shaft 114 from a first annular surface that extends radially outward from the second portion 200b of the outer surface 200 to the third portion 200c of the outer surface 200 and that faces toward the output-side end portion 114a to a second annular surface that extends radially outward from the fourth portion 200d of the outer surface 200 to the third portion 200c of the outer surface 200 and that faces away from the output-side end portion 114a. The threaded through-holes 202 extend along respective axes that are parallel to the central longitudinal axis 102 and allow an operator to couple other components, such as the encoder disc 174, to the central shaft 114, such as with bolts, screws, or other fasteners that extend through the threaded through-holes 202. FIGS. 3, 4A, and 4B illustrate example screws 204 that can be used to couple the encoder disc 174 to the central shaft 114 by extending through the through holes 190 in the encoder disc 174 and being threaded into the threaded through-holes 202 in the central shaft 114.

As also illustrated in FIG. 17, the input-side end portion 114b of the central shaft 114 has a recess, or an opening, or a bore 206 formed in an end surface thereof farthest from the output-side end portion 114a along the central longitudinal axis 102, such that the input-side end portion 114b of the central shaft 114 is hollow. An inner generally cylindrical surface of the input-side end portion 114b, which forms or defines an outer periphery of the bore 206, includes a plurality of alternating grooves 208, which extend axially or longitudinally along the length of the central shaft 114 in respective directions parallel to the central longitudinal axis 102, and ridges 210, which extend axially or longitudinally along the length of the central shaft 114 in respective directions parallel to the central longitudinal axis 102. The grooves 208 and ridges 210 provide a set of spline teeth to which another component, such as an output shaft of a hydraulic or other motor, can be coupled. The spline teeth formed by the grooves 208 and ridges 210 can engage with complementary spline teeth formed in the output shaft of the other component to rotationally lock the output shaft of the other component to the central shaft 114. The spline teeth formed by the grooves 208 and ridges 210 can be provided in a variety of dimensions based on the dimensions of the central shaft 114, and can be configured in accordance with relevant Society of Automotive Engineers (SAE), ISO, or other relevant standards for motor/encoder mounting interface spline teeth. While the grooves 208 and ridges 210 described herein provide a set of spline teeth, in other implementations, the grooves 208 and ridges 210 may alternatively provide a keyed shaft, such as for mating to an output shaft of an electric motor.

The encoder 100 can be assembled by coupling internal components to one another and/or to the output-side portion 104 and the input-side portion 106 of the housing, and then coupling the output-side portion 104 of the housing to the input-side portion 106 of the housing. For example, assembly of the encoder 100 can begin by sliding the seal 172 along the length of the central shaft 114 until the seal 172 is seated on the second portion 200b of the outer surface 200 of the central shaft 114, then sliding the ball bearing 170 along the length of the central shaft 114 until the ball bearing 170 is seated on the first portion 200a of the outer surface 200 of the central shaft 114, and then installing the retaining ring 168 within the groove 198 to retain the seal 172 and the ball bearing 170 on the central shaft 114. The assembly can continue by sliding the encoder disc 174 along the length of the central shaft 114 until the encoder disc 174 is seated on the fourth portion 200d of the outer surface 200 of the central shaft 114 with the through-holes 190 aligned with and adjacent to the through-holes 202, and then securing the encoder disc 174 to the central shaft 114 by screwing the screws 204 through the through-holes 190 and into the through-holes 202.

The assembly can continue by positioning the printed circuit board 160 adjacent to the output-side portion 104 of the housing of the encoder 100 and securing the printed circuit board 160 to the output-side portion 104 by screwing the screws 162 through the printed circuit board 160, through the stand-off elements 161, and into the bore holes 140 formed in the output-side portion 104 of the housing. The assembly can continue by positioning the printed circuit board 164 adjacent to the input-side portion 106 of the housing of the encoder 100 and securing the printed circuit board 164 to the input-side portion 106 by screwing the screws 166 through the printed circuit board 164, through the stand-off elements 165, and into the bore holes 140 formed in the input-side portion 106 of the housing. The assembly can continue by inserting the central shaft 114 through the output side portion 104 of the housing until the output-side end portion 114a extends out of the output side portion 104 of the housing through the aperture 116 and until the ball bearing 170 is seated snugly within the fourth portion 152d of the recess 152 and the seal 172 is snugly seated within the third portion 152c of the recess 152. In such a configuration, the inner race 182 of the ball bearing 170 can be rigidly and securely coupled to the central shaft 114 and the outer race 184 of the ball bearing 170 can be rigidly and securely coupled to the output-side portion 104 of the housing, such that the central shaft 114 can rotate about the central longitudinal axis 102 with respect to the housing, but cannot translate in any direction with respect to the housing.

The assembly can continue by positioning the gasket 158 within the groove 134 and then moving the first and second portions 104, 106 of the housing toward each other until the annular ridge 132 is seated snugly within the first portion 152a of the recess 152, such that the gasket 158 creates a fluid-tight seal between the first and second portions 104, 106 of the housing. The assembly can continue by positioning the gasket 120 within the groove 128 and the electrical connector 110 within the bore hole 148.

The encoder 100 can be operated by coupling an output shaft of a hydraulic or other motor to the input-side end portion 114b of the central shaft 114, such as by engaging spline teeth on an outer surface of the output shaft of the motor with the spline teeth on the inner surface of the input-side end portion 114b, and coupling an input shaft of another component or device, such as a winch or a hoist, to the output-side end portion 114a of the central shaft 114, such as by engaging spline teeth on an inner surface of the input shaft of the other component or device with the spline teeth on the outer surface of the output-side end portion 114a. The encoder 100 can be further coupled and mounted to the motor, such as to a flange thereof configured in accordance with relevant Society of Automotive Engineers standards for motor/encoder mounting interfaces. Such mounting can include using four bolts to secure the encoder to the flange of the motor, with each of the bolts passing through a respective one of the through-holes 112, and using the gasket 120 to seal the input-side portion 106 of the housing to the flange of the motor.

The motor can then be actuated to drive operation of the other component or device such as the winch or hoist, with rotational movement and/or torque transmitted from the motor to the central shaft 114 and from the central shaft 114 to the other component. During such operation, the output-side portion 104 and the input-side portion 106 of the housing and other components secured thereto remain stationary while the central shaft 114 and other components secured thereto rotate within the housing about the central longitudinal axis 102. Thus, during operation, the encoder disc 174 rotates about the central longitudinal axis 102 with respect to the printed circuit boards 160 and 164 and the photodiodes and LEDs mounted thereon. The LEDs can be illuminated on one side of the encoder disk 174 and the photodiodes can measure the amount of light passing through the slots 188 from the LEDs as the encoder disk 174 rotates to measure the speed, direction, and/or position of the encoder disc, and thus of the central shaft 114 and of the drum or spool of the winch or hoist. The electronic components mounted on the printed circuit boards 160 and 164 can be configured to convert such measurements into electrical signals and to communicate those electrical signals indicative of the measurements of speed, direction, and/or position out of the encoder 100 through the electrical connector 110 to other electronic components.

While the encoder 100 described herein is a rotary encoder, the rotary encoder could be modified for use as a linear encoder, such as by coupling the output-side end portion 114a of the central shaft 114 to a sprocket coupled to other mechanical component(s) to convert rotation of the central shaft 114 into linear motion of one or more of the other mechanical components. The encoders described herein can be retrofit onto a wider variety of systems than existing encoders. The encoders described herein can also provide improved measurement accuracy or resolution by being coupled directly to the output shaft of a motor, rather than directly to a drum or spool of a winch or a hoist, in particular because gearboxes incorporated into winches and hoists typically reduce rotational speed from the motor to the drum or spool of the winch or hoist.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a motor including an output shaft;
a rotary encoder including a central shaft having an input end and an output end, the input end of the central shaft mechanically coupled and rotationally locked to the output shaft of the motor; and
a mechanical device selected from the group consisting of: a winch and a hoist;
wherein the mechanical device includes an input shaft, the output end of the central shaft of the rotary encoder mechanically coupled and rotationally locked to the input shaft of the mechanical device.

2. The system of claim 1 wherein the mechanical device includes a gearbox and the input shaft is mechanically coupled directly to the gearbox.

3. The system of claim 2 wherein the mechanical device includes a spool and the gearbox is mechanically coupled directly to the spool.

4. The system of claim 1 wherein the motor includes a flange and the rotary encoder is mounted directly to the flange.

5. The system of claim 4 wherein the rotary encoder includes a housing and a gasket and the gasket seals the housing to the flange of the motor.

6. The system of claim 1 wherein the output end of the central shaft of the rotary encoder has an outer surface that includes a first plurality of spline teeth and the input shaft of the mechanical device has a second plurality of spline teeth engaged with the first plurality of spline teeth.

7. The system of claim 1 wherein the input end of the central shaft of the rotary encoder has an inner surface that includes a first plurality of spline teeth and the output shaft of the motor has a second plurality of spline teeth engaged with the first plurality of spline teeth.

8. The system of claim 1 wherein the input end of the central shaft of the rotary encoder has an outer surface that includes a first portion adjacent to the output end of the central shaft that has a first outer diameter, a second portion adjacent to the first portion that has a second outer diameter greater than the first outer diameter, a third portion adjacent to the second portion that has a third outer diameter greater than the second outer diameter, and a fourth portion adjacent to the third portion that has a fourth outer diameter less than the third outer diameter and less than the second outer diameter.

9. The system of claim 8, further comprising a ball bearing mounted on the first portion of the outer surface of the input end of the central shaft.

10. The system of claim 9, further comprising a seal mounted on the second portion of the outer surface of the input end of the central shaft.

11. The system of claim 10, further comprising an encoder disc mounted on the fourth portion of the outer surface of the input end of the central shaft.

12. The system of claim 10, further comprising:
a groove that extends radially inward into the first portion of the outer surface of the input end of the central shaft; and
a retaining ring mounted in the groove.

13. A method, comprising:
rotationally locking an input end of a central shaft of a rotary encoder to an output shaft of a motor so that the input end of the central shaft is rotationally locked to the output shaft of the motor;
rotationally locking an output end of the central shaft of the rotary encoder to an input shaft of a mechanical device selected from the group consisting of: a winch and a hoist; and
operating the motor to turn the output shaft, the central shaft of the rotary encoder, and the input shaft of the mechanical device.

14. The method of claim 13 wherein torque is transferred directly from the output shaft of the motor to the central shaft of the encoder and directly from the central shaft of the encoder to the input shaft of the mechanical device.

15. The method of claim 14 wherein torque is transferred from the input shaft of the mechanical device to a gearbox of the mechanical device and from the gearbox of the mechanical device to a spool of the mechanical device.

16. The method of claim 15, further comprising using the rotary encoder to measure a position of the spool of the mechanical device.

17. The method of claim 15, further comprising using the rotary encoder to measure a speed of the spool of the mechanical device.

18. The method of claim 13, further comprising mounting the rotary encoder directly to a flange of the motor.

19. A system, comprising:
a rotary encoder including a central shaft having an input end and an output end; and
a mechanical device selected from the group consisting of: a winch and a hoist, wherein the mechanical device includes an input shaft and the output end of the central shaft of the rotary encoder is mechanically coupled and rotationally locked to the input shaft of the mechanical device.

20. The system of claim 19, further comprising a hydraulic motor including an output shaft, wherein the input end of the central shaft mechanically coupled and rotationally locked to the output shaft of the motor.

\* \* \* \* \*